(12) United States Patent
Blanchet et al.

(10) Patent No.: US 11,552,319 B2
(45) Date of Patent: Jan. 10, 2023

(54) BIPOLAR PLATES FOR USE IN ELECTROCHEMICAL CELLS

(71) Applicant: Nuvera Fuel Cells, LLC, Billerica, MA (US)

(72) Inventors: Scott Blanchet, Chelmsford, MA (US); Benjamin Lunt, Tewksbury, MA (US); Ed Domit, Westford, MA (US); Kevin Beverage, Leominster, MA (US); Roger Van Boeyen, Westford, MA (US); Wonseok Yoon, Burlington, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 0 days.

(21) Appl. No.: 13/969,034

(22) Filed: Aug. 16, 2013

(65) Prior Publication Data

US 2014/0051007 A1    Feb. 20, 2014

Related U.S. Application Data

(60) Provisional application No. 61/817,664, filed on Apr. 30, 2013, provisional application No. 61/684,278, filed on Aug. 17, 2012.

(51) Int. Cl.
*H01M 8/06*  (2016.01)
*H01M 8/1007*  (2016.01)
(Continued)

(52) U.S. Cl.
CPC ............ *H01M 8/1007* (2016.02); *C25B 1/04* (2013.01); *C25B 9/05* (2021.01); *C25B 9/77* (2021.01);
(Continued)

(58) Field of Classification Search
CPC ............................ H01M 8/0258; C25B 13/00
See application file for complete search history.

(56) References Cited

U.S. PATENT DOCUMENTS 3,588,987 A * 6/1971 Korostoff ............... B29C 33/02
264/225
6,255,012 B1 * 7/2001 Wilson ................ H01M 8/0221
429/210

(Continued)

FOREIGN PATENT DOCUMENTS

EP    2367227 A2    9/2011
JP    S61-239568 A    10/1986
(Continued)

OTHER PUBLICATIONS

International Search Report and Written Opinion for International Application No. PCT/US2013/055390 dated Oct. 29, 2013, 14 pages.
(Continued)

*Primary Examiner* — Zhongqing Wei
(74) *Attorney, Agent, or Firm* — Finnegan, Henderson, Farabow, Garrett & Dunner LLP

(57) ABSTRACT

The present disclosure is directed towards the design of electrochemical cells for use in high pressure or high differential pressure operations. The electrochemical cells of the present disclosure have non-circular external pressure boundaries, i.e., the cells have non-circular profiles. In such cells, the internal fluid pressure during operation is balanced by the axial tensile forces developed in the bipolar plates, which prevent the external pressure boundaries of the cells from flexing or deforming. That is, the bipolar plates are configured to function as tension members during operation of the cells. To function as an effective tension member, the thickness of a particular bipolar plate is determined based on the yield strength of the material selected for fabricating the (Continued)

bipolar plate, the internal fluid pressure in the flow structure adjacent to the bipolar plate, and the thickness of the adjacent flow structure.

7 Claims, 9 Drawing Sheets

(51) Int. Cl.
    *H01M 8/0273* (2016.01)
    *H01M 8/0232* (2016.01)
    *H01M 8/0247* (2016.01)
    *H01M 8/0223* (2016.01)
    *H01M 8/0245* (2016.01)
    *H01M 8/0228* (2016.01)
    *H01M 8/0206* (2016.01)
    *C25B 1/04* (2021.01)
    *C25B 9/05* (2021.01)
    *C25B 9/77* (2021.01)

(52) U.S. Cl.
    CPC ....... *H01M 8/0206* (2013.01); *H01M 8/0223* (2013.01); *H01M 8/0228* (2013.01); *H01M 8/0232* (2013.01); *H01M 8/0245* (2013.01); *H01M 8/0247* (2013.01); *H01M 8/0273* (2013.01); *Y02E 60/36* (2013.01); *Y10T 29/49108* (2015.01)

(56) References Cited

U.S. PATENT DOCUMENTS

| | | | |
|---|---|---|---|
| 2004/0161653 A1* | 8/2004 | Andrews et al. | 429/34 |
| 2005/0109434 A1* | 5/2005 | Seung | C22C 45/02 148/561 |
| 2006/0010952 A1* | 1/2006 | Valence | B21B 1/28 72/226 |
| 2006/0057452 A1 | 3/2006 | Kim et al. | |
| 2006/0196243 A1* | 9/2006 | Le Viavant | B21B 13/001 72/237 |
| 2006/0251947 A1 | 11/2006 | Carter et al. | |
| 2006/0286429 A1* | 12/2006 | Shiepe | C25B 9/08 429/514 |
| 2006/0286432 A1 | 12/2006 | Rakowski et al. | |
| 2007/0015035 A1* | 1/2007 | Izenson | H01M 8/0206 429/444 |
| 2007/0190383 A1* | 8/2007 | Mogi | H01M 8/0247 429/414 |
| 2009/0081522 A1 | 3/2009 | Washima et al. | |
| 2009/0197137 A1 | 8/2009 | Lee et al. | |
| 2010/0159358 A1 | 6/2010 | Lee et al. | |
| 2010/0216048 A1* | 8/2010 | Braeuninger | H01M 4/881 429/483 |
| 2010/0316193 A1 | 12/2010 | Rödhammer et al. | |
| 2011/0081591 A1 | 4/2011 | Scherer et al. | |
| 2011/0250520 A1 | 10/2011 | Lunt et al. | |

FOREIGN PATENT DOCUMENTS

| | | |
|---|---|---|
| JP | 2001-023652 A | 1/2001 |
| JP | 2003-515237 A | 4/2003 |
| JP | 2009-522718 A | 6/2009 |
| JP | 2010-541134 A | 12/2010 |
| JP | 2012-117140 A | 6/2012 |
| WO | WO 01/37359 A2 | 5/2001 |
| WO | WO 2004/021490 A1 | 3/2004 |
| WO | WO 2007/078106 A1 | 7/2007 |
| WO | WO 2007078106 A1 * | 7/2007 ......... H01M 8/0221 |

OTHER PUBLICATIONS

European Examination Report issued in European Patent Application No. 13 753 394.9 dated Mar. 23, 2017.
Notification of Reasons for Rejection issued in Japanese Patent Application No. 2015-527663 dated Jun. 1, 2017.

* cited by examiner

BIPOLAR PLATES FOR USE IN ELECTROCHEMICAL CELLS

This application claims priority to U.S. Provisional Application No. 61/817,664 filed Apr. 30, 2013, and U.S. Provisional Application No. 61/684,278 filed Aug. 17, 2012, which are incorporated herein by reference in their entirety.

The present disclosure is directed towards electrochemical cells, and more specifically, the design of bipolar plates for use in high pressure or high differential pressure electrochemical cells.

Electrochemical cells, usually classified as fuel cells or electrolysis cells, are devices used for generating current from chemical reactions, or inducing a chemical reaction using a flow of current. A fuel cell converts the chemical energy of a fuel (e.g., hydrogen, natural gas, methanol, gasoline, etc.) and an oxidant (air or oxygen) into electricity and waste products of heat and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms are electrochemically split into electrons and protons (hydrogen ions) at the anode. The electrons flow through the circuit to the cathode and generates electricity, while the protons diffuse through the electrolyte membrane to the cathode. At the cathode, hydrogen protons combine with electrons and oxygen (supplied to the cathode) to produce water and heat.

An electrolysis cell represents a fuel cell operated in reverse. A basic electrolysis cell functions as a hydrogen generator by decomposing water into hydrogen and oxygen gases when an external electric potential is applied. The basic technology of a hydrogen fuel cell or an electrolysis cell can be applied to electrochemical hydrogen manipulation, such as, electrochemical hydrogen compression, purification, or expansion. Electrochemical hydrogen manipulation has emerged as a viable alternative to the mechanical systems traditionally used for hydrogen management. Successful commercialization of hydrogen as an energy carrier and the long-term sustainability of a "hydrogen economy" depends largely on the efficiency and cost-effectiveness of fuel cells, electrolysis cells, and other hydrogen manipulation/management systems.

In operation, a single fuel cell can generally generate about 1 volt. To obtain the desired amount of electrical power, individual fuel cells are combined to form a fuel cell stack. The fuel cells are stacked together sequentially, each cell including a cathode, a electrolyte membrane, and an anode. Each cathode/membrane/anode assembly constitutes a "membrane electrode assembly", or "MEA", which is typically supported on both sides by bipolar plates. Gases (hydrogen and air) are supplied to the electrodes of the MEA through channels or grooves formed in the plates, which are known as flow fields. In addition to providing mechanical support, the bipolar plates (also known as flow field plates or separator plates) physically separate individual cells in a stack while electrically connecting them. The bipolar plates also act as current collectors, provide access channels for the fuel and the oxidant to the respective electrode surfaces, and provide channels for the removal of water formed during operation of the cell. Typically, bipolar plates are made from metals, for example, stainless steel titanium, etc., and from non-metallic electrical conductors, for example, graphite.

Additionally, a typical fuel cell stack includes manifolds and inlet ports for directing the fuel and oxidant to the anode and cathode flow fields, respectively. The stack may also include a manifold and inlet port for directing a coolant fluid to interior channels within the stack to absorb heat generated during operation of the individual cells. A fuel cell stack also includes exhaust manifolds and outlet ports for expelling the unreacted gases and the coolant water.

FIG. 1 is an exploded schematic view showing the various components of a prior art PEM fuel cell 10. As illustrated, bipolar plates 2 flank the "membrane electrode assembly" (MEA), which comprises an anode 7A, a cathode 7C, and an electrolyte membrane 8. Hydrogen atoms supplied to anode 7A are electrochemically split into electrons and protons (hydrogen ions). The electrons flow through an electric circuit to cathode 7C and generate electricity in the process, while the protons move through electrolyte membrane 8 to cathode 7C. At the cathode, protons combine with electrons and oxygen (supplied to the cathode) to produce water and heat.

Additionally, prior art PEM fuel cell 10 comprises electrically-conductive gas diffusion layers (GDLs) 5 within the cell on each side of the MEA. GDLs 5 serve as diffusion media enabling the transport of gases and liquids within the cell, provide electrical conduction between bipolar plates 2 and electrolyte membrane 8, aid in the removal of heat and process water from the cell, and in some cases, provide mechanical support to electrolyte membrane 8. GDLs 5 can comprise a woven or non-woven carbon cloth with electrodes 7A and 7C located on the sides facing the electrolyte membrane. In some cases, the electrodes 7A and 7C include an electrocatalyst material coated onto either the adjacent GDL 5 or the electrolyte membrane 8. Some high pressure or high differential pressure fuel cells use "frit"-type densely sintered metals, screen packs, expanded metals, metal foam, or three-dimensional porous metallic substrates in combination with or as a replacement for traditional GDLs to provide structural support to the MEA in combination with traditional, land-channel flow fields 4 formed in the bipolar plates 2. In some high pressure or high differential pressure cells, metal foams or three-dimensional porous metallic substrates can be used as a replacement for traditional channel-type flow fields 4 as well.

In a typical fuel cell, reactant gases on each side of the electrolyte membrane flow through the three-dimensional porous metallic flow fields or the traditional channel-type flow fields and then diffuse through the porous GDL to reach the electrolyte membrane. Since the flow field and the GDL are positioned contiguously and are coupled by the internal fluid streams, the flow field and the GDL are collectively referred to as "flow structure" hereinafter, unless specified otherwise. It is within the scope of the present disclosure to use traditional channel-type flow fields in combination with three-dimensional porous metallic GDLs, to use three-dimensional porous metallic flow fields in combination with traditional GDLs, or to use three-dimensional porous metallic substrates as both flow fields and GDLs.

Although the use of porous metallic flow structures overcome some of the physical limitations and performance penalties of high pressure or high differential pressure electrochemical cell operation, such electrochemical cells generally face the additional challenge of containing the high pressure fluid within the cell. Typically, high pressure or high differential pressure electrochemical cells have a cylindrical shape, i.e., the cells have circular pressure boundaries, which allow the cells to rely on the hoop stresses generated circumferentially to balance the fluid pressure within the cells. Circular cell profiles, however, complicate the design of cell stacks and manifold geometries, and result in less-than-optimum usage of material for fabrication of the cells. Thus, there is a continuing challenge to improve the design of electrochemical cells to allow flexibility in cell design and scalability of cell stacks, simplify manifold geometries, and maximize material usage for fabrication.

The present disclosure is directed towards the design of electrochemical cells for high pressure or high differential pressure operations. In particular, the present disclosure is directed towards the design of bipolar plates for use in high pressure or high differential pressure electrochemical cells, including, but not limited to, fuel cells, electrolysis cells, hydrogen purifiers, hydrogen expanders, and hydrogen compressors.

A first aspect of the present disclosure is an electrochemical cell for use in high pressure or high differential pressure operations. The electrochemical cell comprises a first electrode, a second electrode, and an electrolyte membrane disposed there between. The cell further comprises at least one bipolar plate, and a first flow structure between the at least one bipolar plate and the first electrode. The at least one bipolar plate of the electrochemical cell has a non-circular base geometry and the thickness of the at least one bipolar plate is determined based on the yield strength of the material selected for fabricating the at least one bipolar plate, the thickness of the first flow structure, and the maximum intended fluid pressure in the first flow structure during operation of the cell.

Another aspect of the present disclosure is a method for fabricating an electrochemical cell for use in high pressure or high differential pressure operations. The method comprises the steps of providing a first electrode, a second electrode, and an electrolyte membrane there between, selecting a material for fabricating a first bipolar plate, calculating the yield strength of the material selected for fabricating the first bipolar plate, determining the thickness of the first bipolar plate based on the calculated yield strength, the thickness of a first flow structure to be positioned adjacent to the first bipolar plate, and the maximum intended fluid pressure in the first flow structure during operation of the cell. The method further comprises fabricating the first bipolar plate using the determined thickness, wherein the first bipolar plate has a non-circular geometry, providing the first bipolar plate on one side of the electrolyte membrane, and providing the first flow structure between the first bipolar plate and the first electrode.

The accompanying drawings, which are incorporated in and constitute a part of this specification, illustrate embodiments of the invention and together with the description, serve to explain the principles of the various aspects of the invention.

It is to be understood that both the foregoing general description and the following detailed description are exemplary and explanatory only and are not restrictive of the invention, as claimed.

Reference will now be made to certain embodiments consistent with the present disclosure, examples of which are illustrated in the accompanying drawings. Wherever possible, the same reference numbers are used throughout the drawings to refer to the same or like parts. It is to be understood that although the present disclosure is described in relation to a high differential pressure electrochemical cell, the devices and methods of the present disclosure can be employed with various types of electrochemical cells, including, but not limited to, high pressure and low pressure electrochemical systems.

Figure 3A:
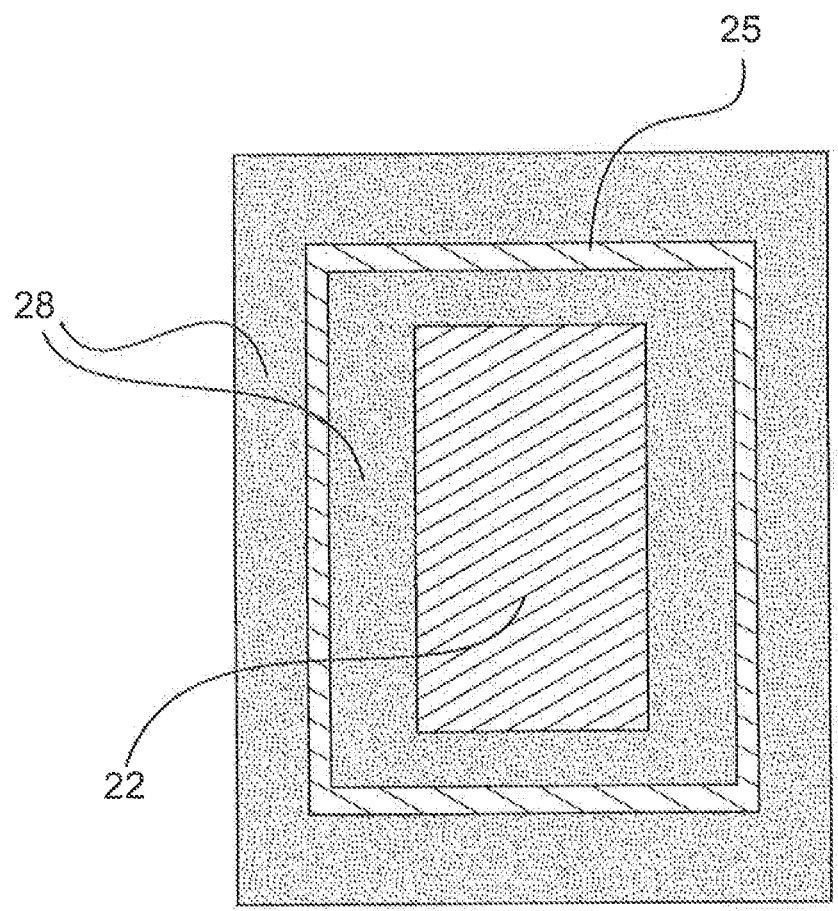
FIGS. 3A and 3B illustrate plan views of the high pressure and low pressure flow structures in electrochemical cells, in accordance with exemplary embodiments of the present disclosure.
Figure 3B:
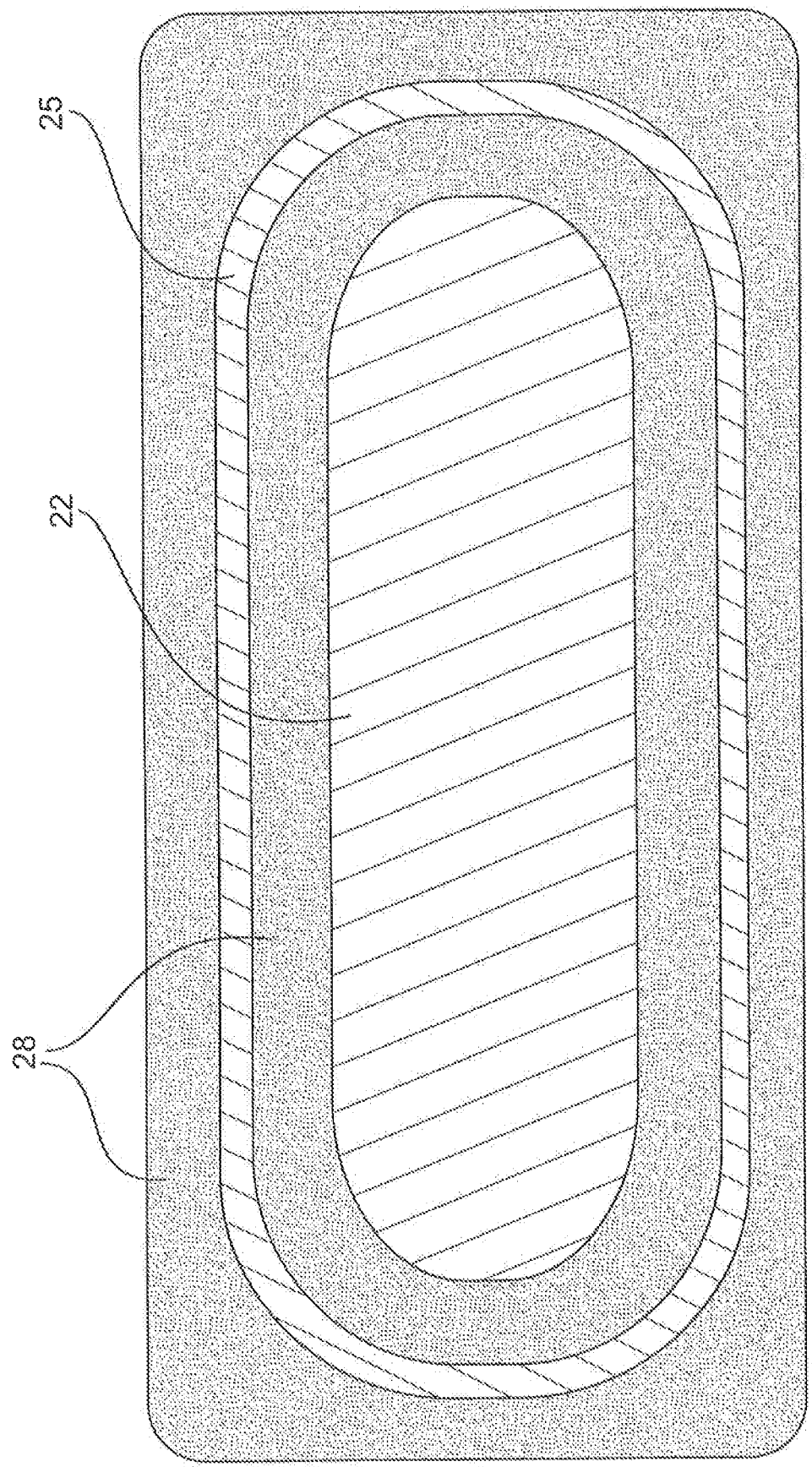

The present disclosure is directed towards the design of bipolar plates for use in electrochemical cells operating under high pressure or high differential pressure. In illustrative embodiments, electrochemical cells for use in high pressure or differential pressure operations have non-circular external pressure boundaries, i.e., the cells have non-circular profiles. In exemplary embodiments, the cells have a generally rectangular profile. In one such embodiment, the cell has a true rectangular profile. In another embodiment, the cell has a square profile. In yet another embodiment, the cell has a "race-track" profile, i.e., a substantially rectangular shape with semi-elliptical lateral sides, as depicted in FIG. 3B. The bipolar plates of such exemplary electrochemical cells have non-circular base geometries. For example, if an illustrative electrochemical cell has a generally rectangular profile, then the corresponding one or more bipolar plates also have generally rectangular base geometries. In additional embodiments, the bipolar plates have generally rectangular profiles with rounded corners to avoid sharp edges in the cell assembly.

Figure 1:
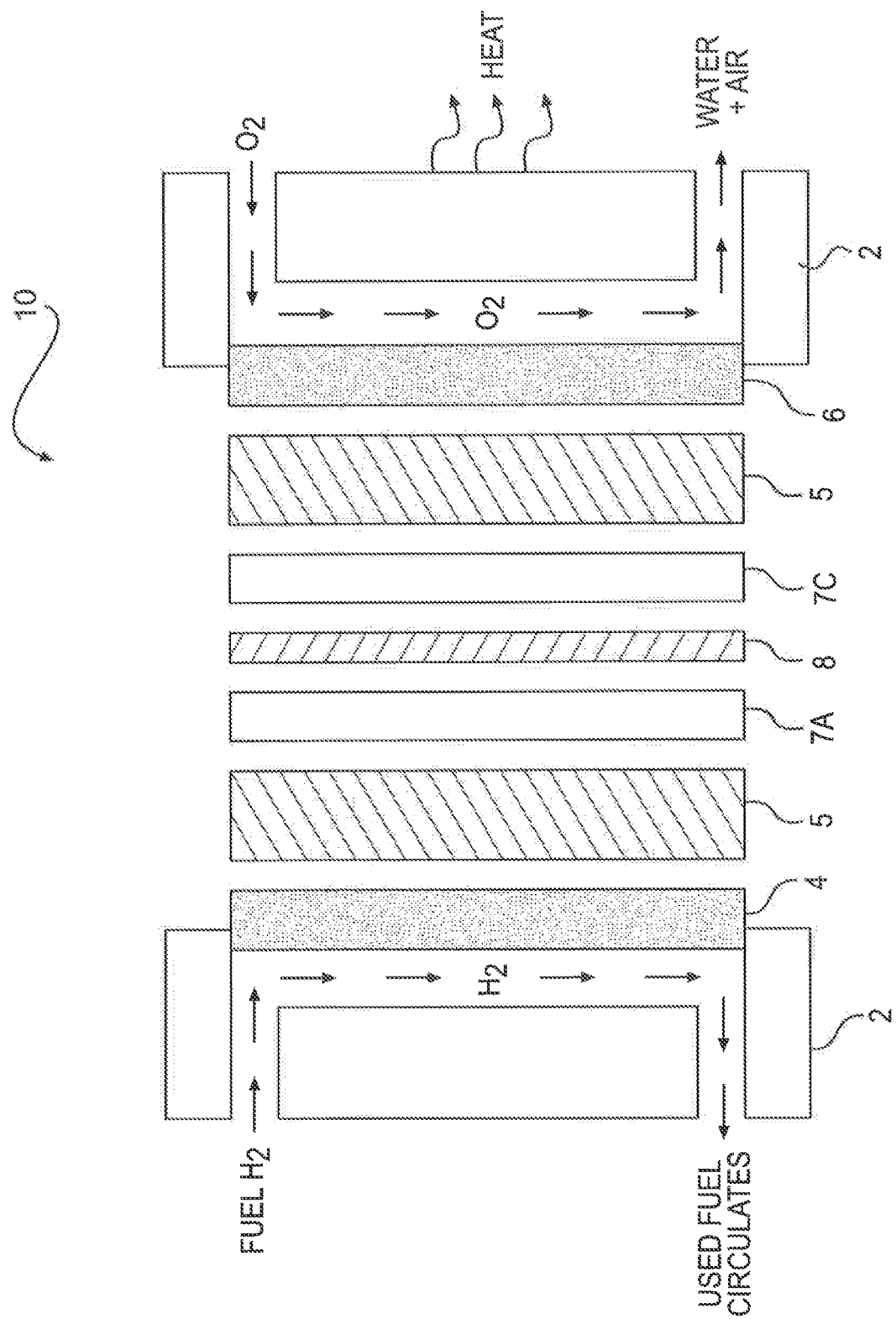
FIG. 1 illustrates an exploded schematic view showing the various components of a prior art Proton Exchange Membrane (PEM) fuel cell.
Figure 2:
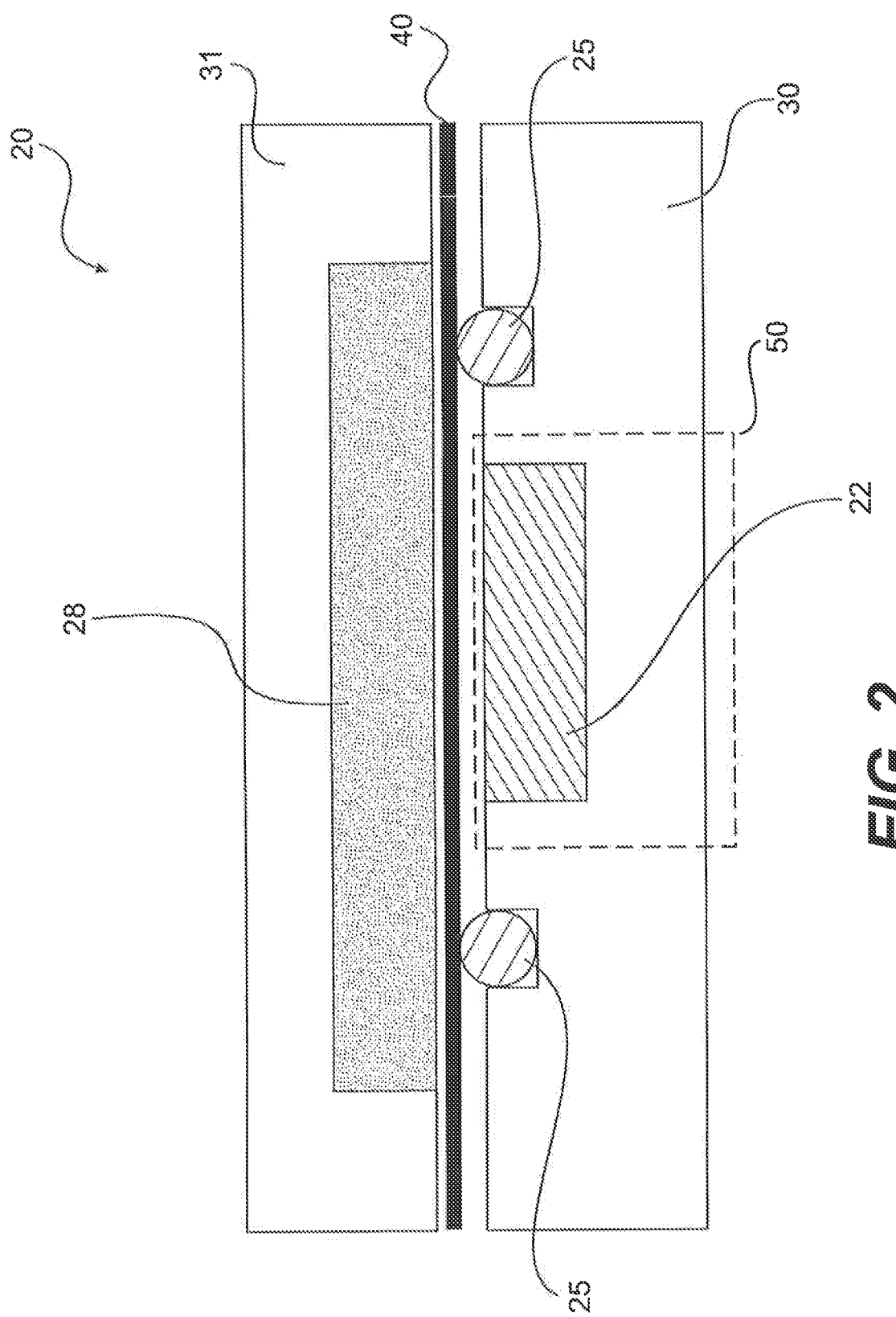
FIG. 2 illustrates a cross-sectional view of an electrochemical cell for use in high differential pressure operations, in accordance with exemplary embodiments of the present disclosure.

FIG. 2 shows a cross-sectional view of a high differential pressure electrochemical cell 20 having a rectangular geometry. As illustrated in FIG. 2, cell 20 comprises a membrane-electrode-assembly (MEA) 40 which is flanked by flow structures 22 and 28 on either side. Flow structures 22 and 28 are surrounded by bipolar plates 30 and 31, respectively, which separate electrochemical cell 20 from the neighboring cells in the stack.

When a cell is used for high differential pressure operations, one of the flow structures in the electrochemical cell is exposed to higher fluid pressure during operation than the flow structure on the other side of the electrolyte membrane. Hereinafter, the flow structure that is exposed to higher fluid pressure during operation is referred to as the "high pressure flow structure" and the flow structure that is subjected to comparatively lower fluid pressures is referred to as the "low pressure flow structure." In the embodiment depicted in FIG. 2, flow structure 22 is designated as the high pressure flow structure and flow structure 28 is designated as the low pressure flow structure. In some embodiments, each electrochemical cell in a cell stack comprises two bipolar plates, one on the high pressure-side and one on the low pressure-side of the cell. In the embodiment depicted in FIG. 2, bipolar plate 30 is situated on the high pressure-side and bipolar plate 31 is situated on the low pressure-side of cell 20. In some other embodiments, two adjacent electrochemical cells in a cell stack share a bipolar plate, i.e., if the stack comprises n cells, then the total number of bipolar plates in the stack is (n+1). In such embodiments, a single bipolar plate can have flow field features on both sides of the plate, for instance, one side supports the low pressure flow structure of one cell and the other side supports the high pressure flow structure of an adjoining cell.

In an exemplary embodiment of a high differential pressure cell, high pressure flow structure 22 has a smaller surface area than low pressure flow structure 28 at the flow structure—MEA interface, i.e., on the sides facing the electrolyte membrane. As illustrated in FIG. 2, the boundary of high pressure field 22 at the flow structure—MEA interface is completely encompassed by the boundary of low pressure flow structure 28. In such an arrangement, the high fluid pressures acting on the electrolyte membrane from the high pressure flow structure 22 is continuously balanced by the structural support provided by the low pressure flow structure 28 located on the other side of the membrane. The uniform and continuous support provided by the low pressure flow structure 28 protects against high stress points on the membrane which are known to cause membrane failure. The reinforcement provided by low pressure flow structure 28 further ensures that the membrane does not flex excessively under the high pressure, thereby preventing membrane rupture.

FIG. 2 further demonstrates that a seal 25, provided between the bipolar plate 30 on the high pressure side and the electrolyte membrane, is contained entirely within the perimeter of the low pressure field on the side facing the membrane, such that the high pressure-side sealing is accomplished against the contiguous low pressure flow structure. Seal 25, also referred to herein as the high pressure-side seal, pinches the membrane against low pressure flow structure 28 to prevent leakage of high pressure gas. Such an arrangement ensures that any discontinuities in the low pressure side (e.g., any portion of the membrane that is not supported by the low pressure flow structure, or any gap between the bipolar plate and the low pressure flow structure) are not exposed to high pressures. In exemplary embodiments, all of the high pressure-side seals in the entire cell stack are within the perimeters of the respective low pressure flow structures.

In some embodiments, if a bipolar plate has a non-circular base geometry, then the adjoining flow structure also has a non-circular geometry. FIG. 3A shows a plan view of the flow structures of an illustrative high differential pressure electrochemical cell having a rectangular geometry. In such an embodiment, flow structures 22 and 28 have rectangular profiles. As illustrated in FIG. 3, the perimeter of the high pressure flow structure 22 is contained entirely within the perimeter of the low pressure flow structure on the side facing the electrolyte membrane. Seal 25 is also contained within the perimeter of the low pressure flow structure on the side facing the membrane, such that the high pressure-side sealing is accomplished against the contiguous low pressure flow structure.

In other embodiments, the base geometry of the one or more bipolar plates in a cell do not correspond to the geometries of the flow structures in the cell. For example, a bipolar plate having a rectangular base geometry can support an adjoining flow structure having a circular geometry. Similarly, the high pressure and low pressure flow structures in a high differential pressure cell can have different geometries. FIG. 3B shows a plan view of the flow structures of an illustrative high differential pressure electrochemical cell where the high pressure flow structure 22 and low pressure flow structure 28 have different geometries. As illustrated in FIG. 3B, the low pressure flow structure 28 has a rectangular profile with rounded corners, while the high pressure flow structure 22 and the high pressure-side seal 25 have a "race-track" profile. The perimeter of the high pressure flow structure 22, as well as seal 25, are contained entirely within the perimeter of the low pressure flow structure 28, as shown in FIG. 3B.

In an illustrative embodiment, flow structures 22, 28 are fabricated using metal foams or other porous metallic substrates. In one such embodiment, an open, cellular flow structure is formed by compacting a highly porous metallic material, such as, a metal foam, sintered metal frit, or any other porous metal. The porous metallic material can comprise a metal, such as, stainless steel, titanium, aluminum, nickel, iron, etc., or a metal alloy, such as, nickel chrome alloy, nickel-tin alloy, etc. In certain embodiments, low pressure flow structure 28 is compacted to a density level greater than that of high pressure flow structure 22. Further, in some embodiments, the compacted porous metallic matrix is laminated on one side with a micro-porous material layer (MPL) to form the flow structure. In additional embodiments, the MPL is coated with an electrocatalyst layer if the electrocatalyst is not integral to the membrane electrode assembly. The resulting laminated structure can be arranged in the electrochemical cell with the electrocatalyst layer positioned adjacent to the membrane. In some embodiments where MPL is not used, the electrocatalyst layer can be coated directly onto the compacted porous metallic substrate on the side facing the electrolyte membrane.

Figure 4:
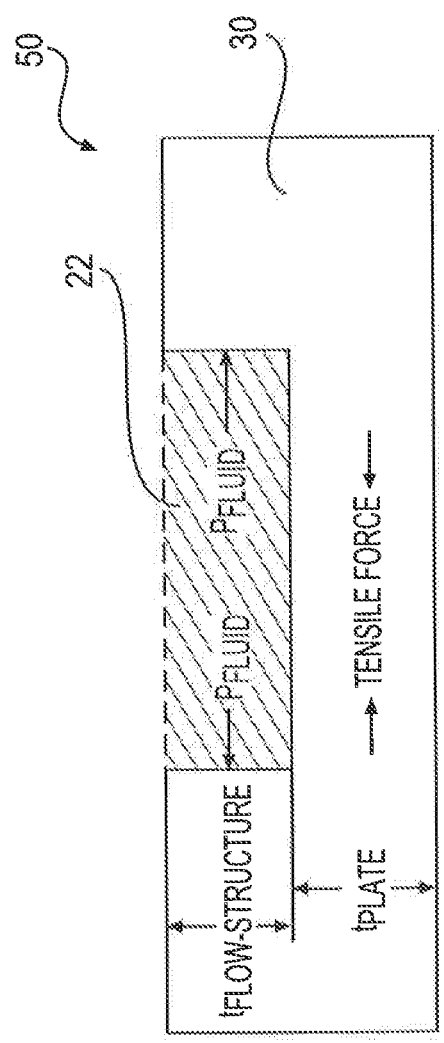
FIG. 4 illustrates an expanded view of a portion of the electrochemical cell depicted in FIG. 2, in accordance with exemplary embodiments of the present disclosure.

FIG. 4 shows an expanded view of area 50 in FIG. 2 to depict the design considerations for bipolar plate 30 in exemplary embodiments of electrochemical cell 20. Similar design considerations can be used for configuring bipolar plate 31 for use in electrochemical cells operated under high pressure. As illustrated in FIG. 4, bipolar plate 30 has a rectangular profile, which indicates that electrochemical cell 20 has a rectangular external pressure boundary. In such electrochemical cells, the internal fluid pressure is transmitted through the high pressure seal (i.e., seal 25) to bipolar plate 30 thereby putting the bipolar plate in tension. That is, bipolar plate 30 functions as a tension member during operation of the cell. The axial tensile forces developed in the bipolar plate balances the internal fluid pressure during operation, and thereby, prevents bulging/flexing of the external pressure boundary of the cell.

In exemplary embodiments, bipolar plate 30 is configured based on the design requirements for a tension member. In order for bipolar plate 30 to function as an effective tension member, the internal fluid pressure of the cell has to be taken into consideration along with the axial cross-sectional area of the plate ("$Area_{plate}$"). The tensile stress ("$F_y$") developed in bipolar plate 30 is a function of the internal fluid pressure ("$P_{fluid}$") developed in flow structure 22 during operation, as shown in equation (1) below.

$$F_y = \frac{\text{Force}}{\text{Area}} = \frac{P_{fluid} * Area_{flow\_structure}}{Area_{plate}} = \qquad (1)$$
$$\frac{P_{fluid} * (Thickness_{flow\_structure} * Width_{flow\_structure})}{Thickness_{plate} * Width_{plate}}$$

wherein "$Area_{flow\text{-}structure}$" represents the axial cross-sectional area of flow structure 22; "$Thickness_{flow\text{-}structure}$" and "$Thickness_{plate}$" represent the thickness of flow structure 22 and the thickness of bipolar plate 30, respectively, as shown in FIG. 4; and "$Width_{flow\text{-}structure}$" and "$Width_{plate}$" represent the width of flow structure 22 and the width of bipolar plate 30, respectively. Based on equation (1), $F_y$ can be said to be proportional to the ratio of $Thickness_{flow\text{-}structure}$ to $Thickness_{plate}$ multiplied by $P_{fluid}$. So if the yield strength of the bipolar plate material (i.e., the amount of stress at which a specified amount of permanent deformation of the plate occurs) is known a priori, then the thickness of bipolar plate 30 can be adjusted to withstand a predetermined amount of tensile stress. Thus, in exemplary embodiments, the thickness of bipolar plate 30 is determined based on the yield strength of the bipolar plate material. For example, if the intended operational pressure of electrochemical cell 20, the thickness of flow structure 22, and the width of the cell (i.e., the widths of flow structure 20 and bipolar plate 30) are known, then the thickness of bipolar plate 30 can be optimized based on the yield strength of the material. This enables the bipolar plate to endure the stress resulting from the axial tensile forces acting on it without causing deformation of the bipolar plate/external pressure boundary. In select embodiments, the thickness of bipolar plate 30 is inversely proportional to the yield strength of the material, i.e., the higher the yield strength of the material, the smaller the thickness of the bipolar plate can be. Lowering the thickness of the bipolar plate can potentially make the electrochemical cell more compact and lightweight. In some illustrative embodiments, the thickness of bipolar plate 30 can range from about 0.03 mm to about 3 mm. For example, the thickness of bipolar plate 30 can range from about 0.03 mm to about 1 mm, from about 0.5 mm to about 2 mm, from about 0.1 mm to about 1 mm, from about 0.2 mm to about 0.8 mm, from about 0.4 mm to about 0.6 mm, etc.

Figure 5:
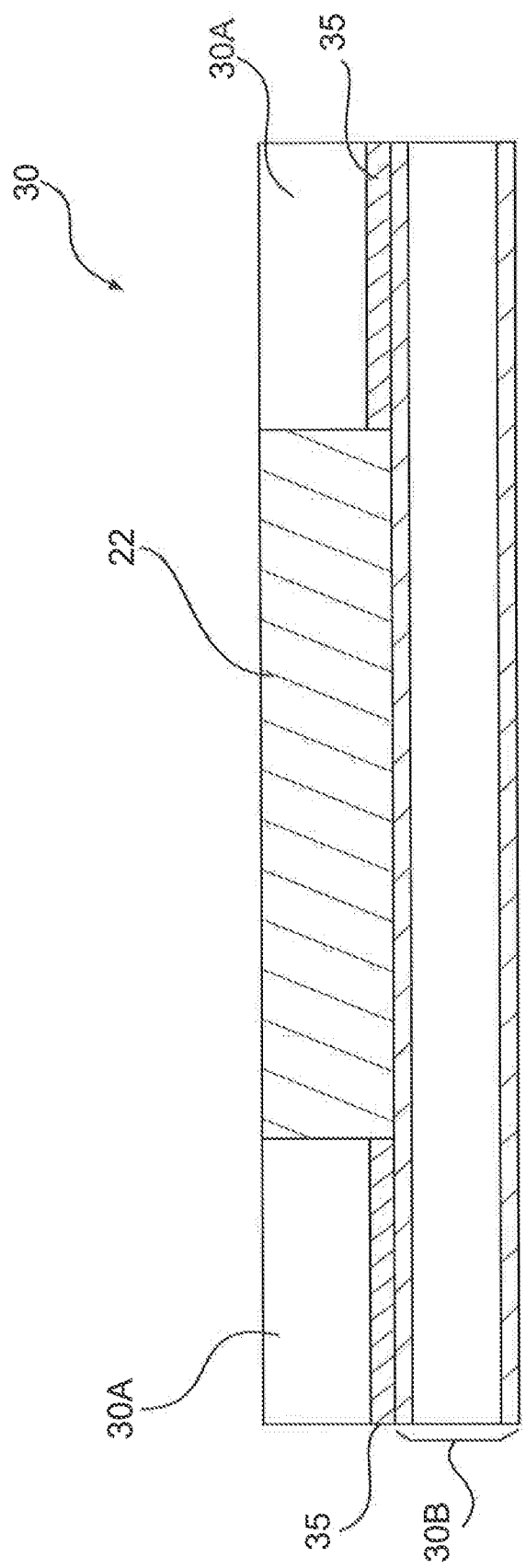
FIG. 5 illustrates a "two-piece" bipolar plate design, in accordance with exemplary embodiments of the present disclosure.

In one embodiment, bipolar plate 30 is fabricated from a single piece of material with a pocket formed in it to contain/support the flow structure, as shown in FIG. 4. In another embodiment, bipolar plate 30 has a "two-piece" design, as illustrated in FIG. 5. In such an embodiment, plate 30 comprises two separate pieces—framing piece 30A, which forms a pocket for the flow structure, and one generally flat plate 30B. The two pieces are bonded at their interface 35 with a bonding method that is strong enough to transmit the pressure force from the flow structure into flat plate 30B without failing. In such an embodiment, Thickness$_{plate}$ refers to the thickness of flat plate 30B. The bonding method can include, but is not limited to, adhesive bonding, welding, thermal bonding with a polymer, etc.

Figure 6:
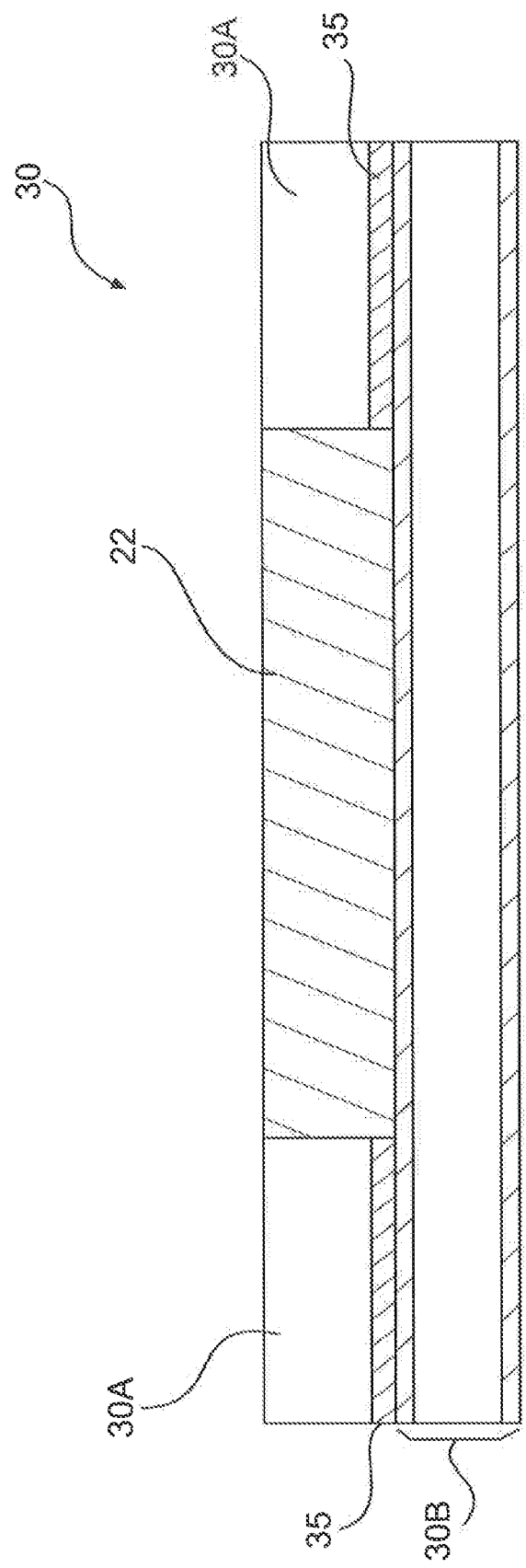
FIG. 6 illustrates a "two-piece" bipolar plate design wherein one of the pieces comprises a clad material, in accordance with exemplary embodiments of the present disclosure.

In exemplary embodiments, bipolar plate 30 can be made from aluminum, steel, stainless steel, titanium, copper, Ni—Cr alloy, Inconel, or any other electrically conductive material. In one embodiment, bipolar plate 30 comprises a clad material, for example, aluminum clad with stainless steel on one or both sides. FIG. 6 illustrates a "two-piece" bipolar plate 30 wherein flat plate 30B comprises a clad material. Cladding provides the unique advantages of both metals— for example, in the case of a bipolar plate fabricated from stainless steel-clad aluminum, the stainless steel protects the aluminum core from corrosion during cell operation, while providing the superior material properties of aluminum, such as, high strength-to-weight ratio, high thermal and electrical conductivity, etc.

In some embodiments, bipolar plate 30 may comprise a "two-piece" design having interlocking features 40 to engage framing piece 30A with flat plate 30B. Interlocking features 40 may form a mating geometry sufficient to secure framing piece 30A and flat plate 30B together. For example, framing piece 30A may include a first part 41 of interlocking feature 40, and flat plate 30B may include a second part 43 of interlocking feature 40. First part 41 and second part 43 may be configured to provide a fixed attachment between framing piece 30A and flat plate 30B. The attachment may be a removable attachment, for example for serving bipolar plate 30.

Figure 7:
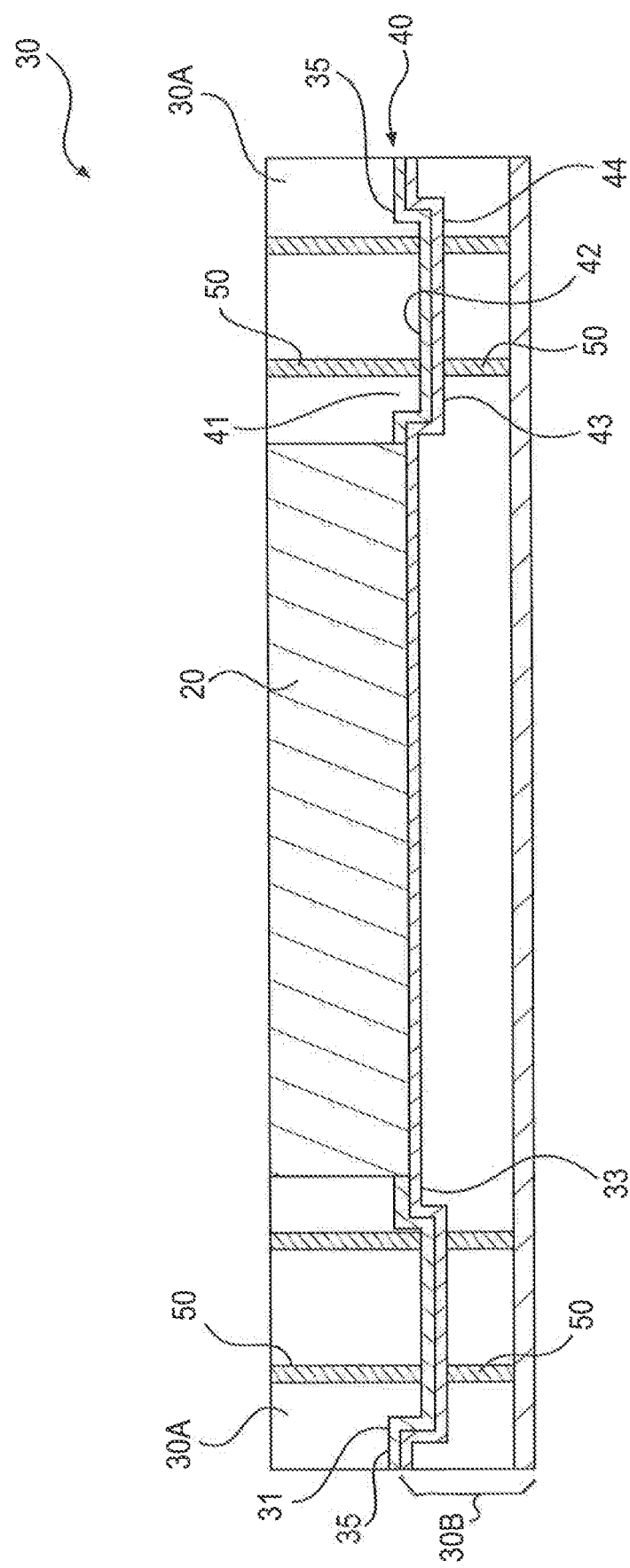
FIG. 7 illustrates another "two-piece" bipolar plate design, in accordance with exemplary embodiments of the present disclosure.
Figure 8:
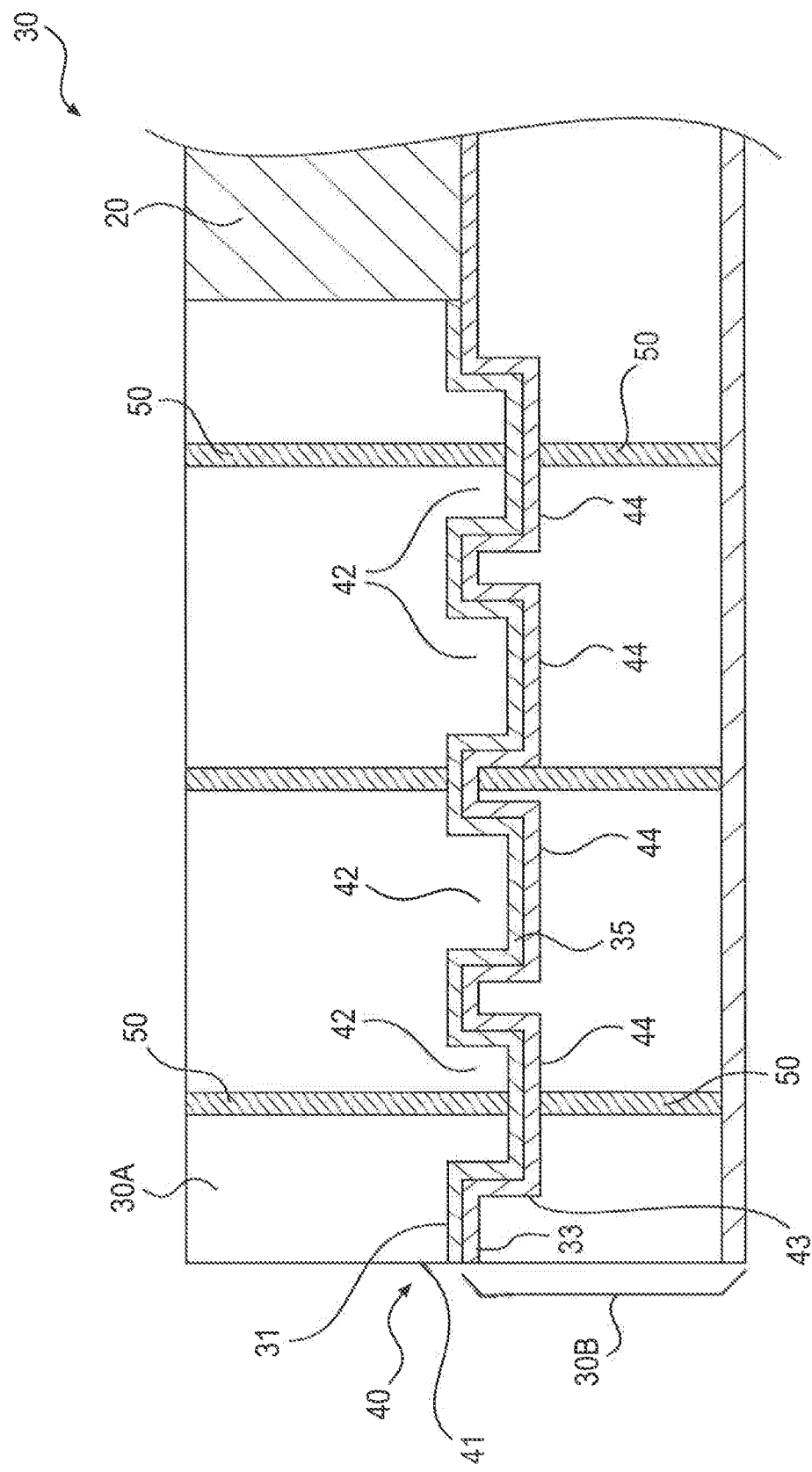
FIG. 8 illustrates another "two-piece" bipolar plate design, in accordance with exemplary embodiments of the present disclosure.

As shown in FIGS. 7 and 8, first part 41 may comprise one or more protrusions 42, and second part 43 may comprise one or more indentations 44. It is further contemplated that first part 41 and second part 43 may comprise various attachment mechanisms. Protrusions 42 may be configured to mate with indentations 44. Additionally, protrusions 42 may include projections or protuberances extending outward from framing piece 30A, and located on a bottom surface 31 of framing piece 30A. Indentations 34 may include grooves or depressions extending inward from flat plate 30B, and located on a top surface 33 of flat plate 30B. In one embodiment, as shown in FIG. 7, framing piece 30A includes one protrusion 42 and flat plate 30B includes one indentation 44. However, it is further contemplated that framing piece 30A may comprise multiple protrusions 42, for example, 2, 4, 10, 25, or 100 protrusions. Furthermore, flat plate 30B may comprise a corresponding number of indentations 44. FIG. 8 shows one embodiment where framing piece 30A comprises 4 protrusions 42 and flat plate 30B comprises 4 corresponding indentations 44.

In other embodiments, framing piece 30A and flat plate 30B may each comprise at least one protrusion 42 and at least one indentation 44. Additionally, framing piece 30A may include indentations 44 and flat plate 30B may include protrusions 42.

As shown in FIGS. 7 and 8, interlocking features 40 may comprise various shapes and sizes. For example, protrusions 42 and indentations 44 may be formed cylindrical, round, elliptical, rectangular, or square in shape. Additionally, protrusions 42 and indentations 44 may include various polygonal shapes. In some embodiments, framing piece 20A and flat plate 30B may include multiple interlocking features 40 with different shapes. In other embodiments, all interlocking features 40 on framing piece 30A and flat plate 30B may be the same.

Protrusions 42 and indentations 44 may be any suitable shape and dimension. For example, protrusions 42 and indentations 44 may be shaped and sized to form a sealing engagement that prohibits the passage of fluid. In some embodiments, protrusions 42 may comprise a slightly larger size than indentations 44, so that protrusions 42 may be configured to be disposed within and slidingly engage indentations 44. For example, protrusions 42 may slide within indentations 44, and indentations 44 may range from less than about 1 mm to greater than about 50 mm in length, such as, for example, from about 2 mm to about 40 mm, from about 3 mm to about 30 mm, from about 4 mm to about 20 mm, from about 4 mm to about 10 mm. Protrusions 42 may range from less than about 1 mm to greater than about 50 mm in length. In one embodiment, protrusions 42 may be about 5 mm in length and indentations 44 may be about 5 mm in length. In a further embodiment, protrusions 42 may be 5 mm in length, and indentation 44 may be 5.05 mm in length.

Protrusions 42 and indentations 44 may be oriented at varying degrees with regard to first and second surfaces 31, 33. For example, protrusions 42 and indentations 44 may be perpendicular to first and second surfaces 31, 33. In other embodiments, protrusions 42 may form a first angle ranging from about 2 to about 90 degrees with first surface 31, and indentations 44 may form a second angle ranging from about −45 to about +90 degrees with second surface 33. Second angle may be equal or greater to first angle.

It is further contemplated that protrusions 42 or indentations 44 may include one or more passageways 50 configured for the flow of gas therethrough (FIGS. 7 and 8). Passageways 50 on framing surface 20A may be aligned with passageways 50 on flat plate 30B. In some embodiments, passageways 50 may include porous holes randomly disposed in framing surface 30A and flat plate 30B. Gas may enter passageways 50 and flow into fuel cell 10.

In other embodiments, interlocking features 40 may include various connections suitable to sealing engage first and second plates. For example, interlocking features 40 may include a seal gland and seal, an O-ring gland, or an O-ring.

Protrusions 42 and indentations 44 may be disposed in regular or random patterns on framing surface 30A and flat plate 30B. For example, protrusions 42 and indentations 44 may be disposed around an outer border of first and second surfaces 31, 33. Additionally or alternatively, protrusions 42 and indentations 44 may be disposed near the center of each plate. The disposition of protrusions 42 and indentations 44 may be sporadic or in a uniform arrangement. In some embodiments, protrusions 42 and indentations 44 are disposed to minimize the shear stress on the bonded surfaces 31, 33.

Protrusions 42 and indentations 44 may be formed of, for example, stainless steel, aluminum, graphite, polymers, and various composites. In some embodiments, protrusions 42 and indentations 44 may comprise the same material. In other embodiments, protrusions 42 may comprise a first material and indentations 44 may comprise a second material, wherein the first and second materials are different. It is further contemplated that indentations 44 may include an elastomeric polymer configured to expand within protrusions 42 and form a sealing engagement. Suitable elastomeric polymers may include, for example, EPDM, Viton®, and neoprene.

Framing surface 30A and flat plate 30B may additionally be secured with one or more additional attachment mechanisms including, for example, bonding material, welding, brazing, soldering, diffusion bonding, explosive bonding, ultrasonic welding, laser welding, resistance welding, or sintering at interface 35. In one embodiment, the bonding material may include an adhesive. Suitable adhesives include, for example, epoxies, cyanoacrylates, thermoplastic sheets (including heat bonded thermoplastic sheets) urethanes, and other polymers. The friction fit of interlocking features 40 and the bonding material may sealingly secure framing surface 30A with flat plate 30B. In other embodiments, the friction fit of interlocking features 40, without the use of a bonding material, may sealing secure framing surface 30A with flat plate 30B.

Interlocking features 40 may provide a nesting arrangement of framing surface 30A with flat plate 30B. For example, as shown in FIGS. 7 and 8, framing surface 30A may be nested within flat plate 30B. The nested arrangement may provide a strong and secure connection, and therefore reduce the shear strength of an adhesive required to secure framing surface 30A and flat plate 30B together. For example, sear forces carried by protrusions 42 may create a generally stronger material for securing framing surface 30A and flat plate 30B. The nesting arrangement may also isolate materials of bipolar plate 30 from exposure to a fluid stream, for example a coolant which may otherwise cause corrosion. Additionally, the nesting arrangement may provide quick and easy assembly of framing surface 30A and flat plate 30B in a fuel cell stack, and therefore reduce the expense of repair.

When nested together, framing surface 30A and flat plate 30B may facilitate heat transfer between a first fuel cell and a second fuel cell in a fuel cell stack. The sealing arrangement of interlocking features 40 may also prevent fluid from entering fuel cell 10, and thereby reduce galvanic corrosion caused from the leakage of fluid into the cell. Such may provide an electrochemical cell with a longer life and increased performance.

Additionally, the electrochemical cells of the present disclosure, having non-circular profiles (i.e., non-cylindrical cell stacks), have certain advantages over electrochemical cells with circular profiles. For instance, non-circular profiles enable design flexibility and scalability in two dimensions (number of cells and cell width) without the need to re-engineer the manifold design or the fluidic distribution system of the cell. Non-cylindrical cell stacks in particular rectangular profile stacks, enable easy manifold geometries, including options for cross-flow stack designs. Additionally, non-circular profiles enable maximum material utilization in high volume production and, therefore, lower the overall manufacturing costs.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electrochemical cell comprising:
    a first electrode, a second electrode, and an electrolyte membrane disposed there between;
    a first bipolar plate adjacent the first electrode and a second bipolar plate adjacent the second electrode;
    a first flow structure enclosed by the first bipolar plate and the first electrode, the first flow structure including a flow field and a porous gas diffusion layer;
    a second flow structure enclosed by the second bipolar plate and the second electrode, the second flow structure including a flow field and a porous gas diffusion layer;
    wherein an area of the side of the first flow structure that interfaces with the first electrode is smaller than an area of the side of the second flow structure that interfaces with the second electrode;
    wherein the first bipolar plate has a non-circular base geometry and is constructed of two pieces, one of the pieces forms a frame around the first flow structure and the other piece is a generally flat plate, the frame and the flat plate have interlocking features wherein the frame comprises at least one protrusion or indentation to mate with at least one corresponding indentation or protrusion on the flat plate; and
    wherein the thickness of the first bipolar plate is equal to or greater than the thickness of the first flow structure multiplied by the ratio of a predetermined fluid pressure in the first flow structure to the yield strength of the first bipolar plate.

2. The electrochemical cell of claim 1, wherein the electrochemical cell has a non-circular external pressure boundary.

3. The electrochemical cell of claim 2, wherein the electrochemical cell has a rectangular external pressure boundary.

4. The electrochemical cell of claim 1, wherein the second flow structure is exposed to lower pressure than the first flow structure during operation of the electrochemical cell.

5. The electrochemical cell of claim 1, further comprising a seal positioned between the first bipolar plate and the first electrode around the periphery of the first flow structure, wherein the seal is positioned within a perimeter of the side of the second flow structure interfacing with the second electrode.

6. The electrochemical cell of claim 1, wherein at least one of the first flow structure and the second flow structure comprises a porous substrate.

7. An electrochemical cell comprising:
a first electrode, a second electrode, and an electrolyte membrane disposed there between;
a first bipolar plate adjacent the first electrode and a second bipolar plate adjacent the second electrode;
a first flow structure enclosed by the first bipolar plate and the first electrode;
a second flow structure enclosed by the second bipolar plate and the second electrode;
wherein an area of the side of the first flow structure that interfaces with the first electrode is smaller than an area of the side of the second flow structure that interfaces with the second electrode;
wherein the first bipolar plate and the second bipolar plate are composed of metallic material;
wherein the thickness of the first bipolar plate is equal to or greater than the thickness of the first flow structure multiplied by the ratio of a predetermined fluid pressure in the first flow structure to the yield strength of the first bipolar plate.

* * * * *